(12) United States Patent
Caswell et al.

(10) Patent No.: US 6,816,113 B2
(45) Date of Patent: Nov. 9, 2004

(54) GPS RECEIVER AND RELATED METHOD

(75) Inventors: Anne C. Caswell, Reigate (GB); Saul R. Dooley, Reigate (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 58 days.

(21) Appl. No.: 10/213,406

(22) Filed: Aug. 6, 2002

(65) Prior Publication Data

US 2003/0063028 A1 Apr. 3, 2003

(30) Foreign Application Priority Data

Sep. 13, 2001 (GB) .............................................. 0122228

(51) Int. Cl.⁷ ............................................ H04B 7/185
(52) U.S. Cl. ................................................ 342/357.15
(58) Field of Search ....................... 342/357.01, 357.06, 342/357.15, 374; 701/213, 215

(56) References Cited

U.S. PATENT DOCUMENTS 6,133,873 A  10/2000  Krasner ................. 342/357.12
6,366,599 B1 * 4/2002  Carlson et al. ............. 375/130
2002/0039381 A1 * 4/2002  Dooley et al. .............. 375/147

* cited by examiner

Primary Examiner—Dao Phan
(74) Attorney, Agent, or Firm—Peter Zawilski

(57) ABSTRACT

Disclosed is a method of operating a GPS receiver for the acquisition of GPS signals through the processing of the receiver signal over an integration time period, including the step of switching the integration time period of the receive between two discrete values where the controlling step of switching between the two discrete values is responsive to a signal, other than a GPS signal, indicative of the environmental factors within which the receiver is located, wherein the receiver employs (1) a predetermined operational profile and said at least two discrete integration time periods form part of the said profile or (2) a control signal for controlling said switching step is developed on the basis of an estimation of the local environment based on a time-indicating signal.

11 Claims, 1 Drawing Sheet

GPS RECEIVER AND RELATED METHOD

FIELD OF INVENTION

The present invention relates to a method of operating a GPS receiver for the acquisition of GPS signals through the processing of a received signal over an integration time period and including the step of switching the integration time period of the receiver between two discrete values.

BACKGROUND TO INVENTION

GPS devices are arranged to provide accurate positional information and are employed increasingly with mobile communication devices so as to allow for a relatively accurate determination of the geographical location of the communications device at any particular time. GPS receiver devices are arranged for the acquisition of GPS signals transmitted from a constellation of satellites and, generally through the employment of three separate GPS signals, calculate the receiver's location based upon a predetermined acquisition strategy. Such strategy can include a determination of which one or more satellites to search for, the particular integration time within which each satellite signal is processed and the identification of an acceptable time period within which to expect to acquire the required signal. One such factor, i.e the integration time period required for processing the received signal will differ depending upon the strength of the incoming signal. For example, in strong signal conditions, integration times in the region of 1 ms for each satellite can prove acceptable for detection and signal acquisition whereas, in environments where the GPS signal maybe somewhat attenuated, for example in forests, and built-up areas and generally enclosed areas, longer integration times will be required in order to achieve the necessary processing gain to compensate for such attenuation. Current GPS receivers are arranged to process the received GPS signals over an integration period of between 1 and 10 ms.

While, in practice, most GPS receivers at present only offer suitable functionality to integrate for 1 ms, it has been proposed that a receiver control arrangement be provided such that, if insufficient satellite signals are detected after a predetermined period, for example, 10 seconds, then the integration time is increased to, for example, 10 ms.

U.S. Pat. No. 6,133,873 discloses such a method for adaptively processing a GPS signal in an attempt to optimize the initial acquisition of GPS signals wherein, if a GPS signal is not appropriately received within a predetermined integration time, the integration time is increased before another attempt is made to receive the signal.

Also, it has been proposed that a predetermined maximum time limit be provided for acquisition such that, if no satellites are detected within that predetermined period, the user is then prompted to indicate whether the GPS receiver might be positioned in a location, for example indoors, where receipt of the GPS signals is unlikely to be achievable such that no further battery power need be wasted in attempting signal acquisition.

In general, the calculation of location in GPS systems changes in different environments and a move to a new environment causes a delay in the system while the new location is calculated using the standard integration time. In this manner, integration time is not optimised and this can lead to disadvantageous delays in signal acquisition and wastage of battery power.

Although it could be considered that the prior-art problems could be overcome merely by increasing the integration time so as to allow for operation of the GPS receiver when experiencing poor signal-acquisition conditions, such a strategy can prove disadvantageous in that, for each increase in integration time, the acquisition time increases at an exponential rate. Thus, if the integration time is increased by a factor of 10, the acquisition time is likely to increase by a factor of 100, as does the power consumption of the receiver circuitry.

As suggested above, location calculation within a GPS system is relatively power consuming and also represents a complex calculation which, even in good signal conditions, will take in the region of 1–15 seconds. Thus, excessive power consumption is particularly undesirable in mobile devices employing on-board power sources. A long acquisition time is also an undesirable aspect since a user will in any case wish to obtain a position-fix as quickly as possible.

OBJECTION OF INVENTION

The present invention seeks to provide for a GPS receiver arrangement and related method of offering advantages over known such receivers and methods.

SUMMARY OF INVENTION

According to one aspect of the present invention, there is provided a method of operating a GPS receiver as defined above, and characterized by the steps of switching between the said two discrete values of integration time period in response to a signal indicative of the environment in which the receiver is located.

The present invention is advantageous in reducing acquisition time by optimizing integration time on the basis of local environmental factors and so as to decrease the prevailing average power consumption and thus acquisition time. In seeking to optimize the integration time period for processing the received signal, power wastage and delays can therefore be reduced in poor signal conditions since the receiver does not first attempt a position fix within appropriately short integration times, and in strong signal conditions by not employing unnecessarily long integration times.

As further described below, certain aspects of the invention prove particularly advantageous in improving the flexibility of response offered by the invention to different environmental conditions. Moreover, to allow for a particularly accurate, but readily altered, selection of appropriate integration time periods and allow for alternated, and accurate, control of the integration time period. Still further, the certain aspects of the invention enable a successful acquisition strategy can subsequently be employed so as to reduce future power overheads when signal acquisition is required under similar environmental conditions and in improving the flexibility and simplicity with which environmental conditions can be recognized.

According to another aspect of the present invention as provided a GPS receiver arranged for the acquisition of GPS signals through the processing of the received signals over an integration time period, the receiver being arranged to operate with either of at least two discrete integration time periods and including control means for switching between the said integration time periods, characterized in that the said control means is responsive to a signal indicative of the environment within which the receiver is located.

Advantageously, the invention can provide for such a receiver and including means arranged for operating in accordance with any one or more of the method steps defined above.

BRIEF DESCRIPTION OF DRAWINGS

The invention is described further hereinafter, by way of example only, with reference to the accompanying drawings in which.

DETAILED DESCRIPTION

Figure 1:
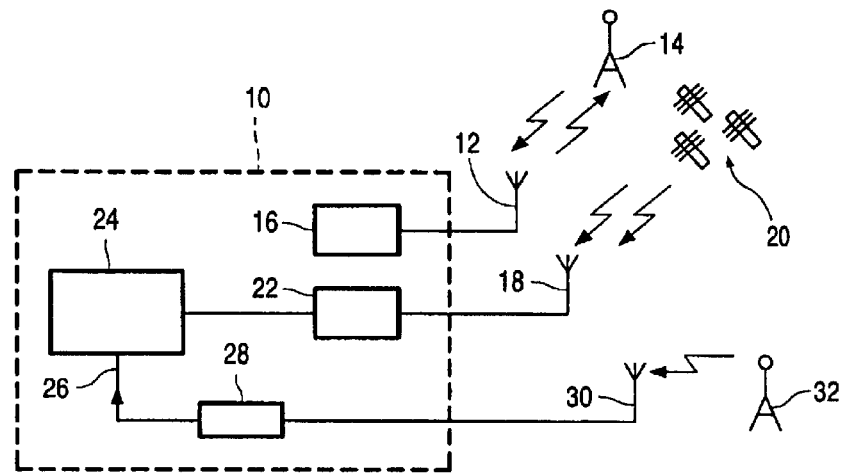
FIG. 1 is a schematic block diagram of a mobile communications device according to one embodiment of the present invention.

Turning first to FIG. 1, there is illustrated a mobile communications device such as a mobile phone 10 including an antenna 12 for exchanging communications signal with a node, for example a base station antenna 14, of a communications network. The communications signals transmitted from the antenna 12, are delivered from a transceiver unit 16 also arranged to receive the incoming communications signals transmitted to the antenna 12 from the base station antenna 14. The transceiver 16 connects to the remaining functionality of the mobile phone 10 which, in the illustrated example, is standard and so is not described any further.

The mobile phone 10 also includes a GPS antenna 18 which is arranged to receive GPS signals from a constellation of satellites 20. The incoming GPS signals are delivered by the GPS antenna 18 to a GPS receiver unit 22 which, in turn, delivers the signals to a processing unit 24 arranged to acquire the incoming GPS signals through the processing of the received signals over an integration time period. Such integration of the incoming signal comprises one aspect of the processing of the GPS signal so as to obtain a position fix for the mobile phone 10.

A mobile phone according to the present invention includes additional functionality which, in FIG. 1, is illustrated by reference to a integration time period control signal 26 derived from an integration controller 28 arranged to receive a signal from an antenna 30. In the illustrated example of FIG. 1 the antenna 30 is arranged to receive a signal from a local stationary antenna 32 arranged to transmit signals carrying data serving to identify at least one characteristic of the local environment. Such environmental data is received by the antenna 30 and processed by the integration time controller 28 such that the integration time period control signal 26 serves to control the integration time period within the processor 24 in a manner best suiting the local environment within which the mobile phone 10 is located and as indicated by the stationery antenna 32.

Figure 2:
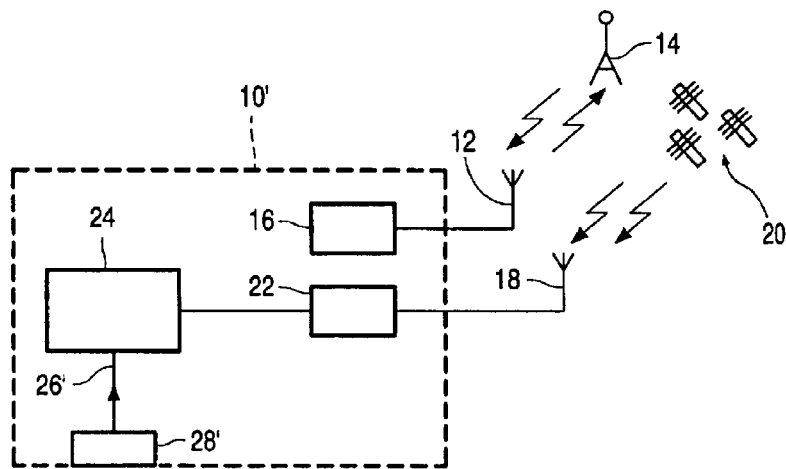
FIG. 2 is a schematic block diagram illustrating a further embodiment of the present invention.

Turning now to FIG. 2, there is illustrated another schematic block diagram of an alternative embodiment to the present invention and are identified by the same reference numerals. FIG. 2 illustrates a mobile phone 10' in which an integration time period control signal 26' is derived by means of an integration time period controller 28' in the form of a user interface allowing for direct input form the user. In this manner, the appropriate responsive variation in the integration time period within the processor 24 is not dependent upon an incoming signal from a local stationary antenna. Rather, the user themselves can identify the prevailing environmental conditions and input appropriate data into the user interface 28' so as to generate the appropriate integration time period control signal 26' serving to control the integration time period within the processor 24. While this embodiment relies upon the experience and knowledge of the user to identify the appropriate environmental conditions, it nevertheless does not rely upon an additional external communications link as is the case with the embodiment of FIG. 1.

Figure 3:
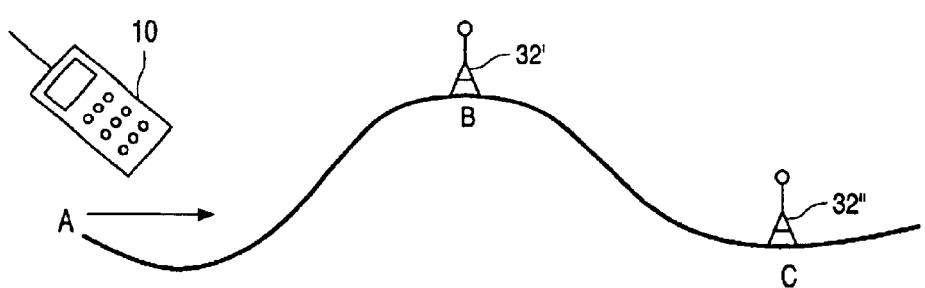
FIG. 3 is a schematic diagram of the receiver of FIG. 1 when in use and passing between two different environments.

Turning now to FIG. 3, there is shown a schematic illustration of the mobile phone 10 of FIG. 1 as travelling in the direction of an arrow A and from a first environment B to a second environment C and each of which environments exhibit different characteristics which, in accordance with the present invention, can advantageously be employed to control the integration time period employed within the processor 24. For example, the antenna 32' is located in an elevated position likely to offer a clear line of sight to a constellation of satellites such that only a relatively short integration time period should be required in order to achieve an accurate position fix. The signal transmitted from the antenna 32' therefore includes data seeking to control the integration time period within the mobile phone 10 in this manner. In the region of environment C however, which is at a lower, more sheltered, position than environment B, the line of sight to the constellation of satellites is unlikely to be as good as that available at location B and so the data contained within the signals transmitted from antennae 32" serves to control the integration time period within the mobile phone 10 so as to increase that time period to allow for the required position fix.

As described further below, each of the at least two different integration time periods can form part of one of a possible plurality of signal acquisition profiles. Each such profile exhibits a predetermined acquisition strategy employing a variety of potential integration times dependent upon environmental conditions and each of which integration times is arranged to be provided for a respective predetermined time limit which itself can differ for each different integration time period. Various modes of operation can be provided within each profile as to improve the flexibility and sensitivity of the device. Thus, the present invention can effectively provide for a GPS receiver device exhibiting a plurality of acquisition strategies, the selection of which is responsive to environmental factors insofar as each such profile includes discrete integration time periods which are selected in response to environmental factors.

As a further development, the invention can provide for the storage of multiple profiles comprising different satellite acquisition strategies. Such profiles can comprise records of which integration times to use, and for what duration, for each satellite. Thus, they can serve to define multiple procedures by which one could initiate GPS signal acquisition. Each profile can be suitable for a different user environment and profile selection can be achieved by the user through a suitable user interface or by a control signed derived from a remote device such as a communication service base station.

The GPS device can advantageously then learn what are the likely best acquisition strategies by reference to a history of successful position fixes, or for example, by receiving such data from a local broadcast service.

The GPS device then exhibits the potential for achieving reduced power consumption and acquisition time, by choosing an acquisition strategy that is best suited to the environment, rather than blindly using a general strategy.

The user can select one of a number of known general profiles on the GPS device such as indoor, outdoor, suburban, etc, or more specific profiles such as Philips Research Laboratories, etc. This can be achieved by means of a conventional user interface.

Another embodiment is arranged to operate such that the user's device can receive data identifying the local environment from another device or base station etc. For example an estimation of the local environment can be based upon date and time of day information for example, having identified it is 8:15 am on a Monday morning, it can be determined that the user is probably on their way to work and thus on a route of predetermined location and exhibiting predetermined environmental conditions.

The suitable parameters such as integration time within these profiles could be learnt by the handset by previous successful position fixing. That is, if a position fix is first made using a blind strategy, and it is possible to associate an environment with that position, then the profile could be updated accordingly and the handset then learns the optimal profiles for that user's usual locations. This is potentially very useful as sensitivity of GPS receivers are of course different for each receiver whereas this learning process optimizes profiles for the particular receiver in your handset. Also, the profiles could be shared or periodically updated amongst all of the user's GPS devices.

Alternatively, the profiles could be broadcast to the user by some local service such as a Bluetooth beacon network.

Profiles could also indicate which mode to use in a hybrid device, e.g. whether to use hardware correlators or a software (recording of a snapshot) type approach to acquire the GPS satellites. Hardware correlators are more suitable having regard to power consumption requirements and if small integration times are necessary, whereas software correlators are more suitable for longer integration times.

An example of relatively simple profiles with two modes is illustrated in the following table.

| Environment | Integration time 1 | Time limit | Integration time 2 (if integration time 1 yields no result) | Time limit |
| --- | --- | --- | --- | --- |
| Outdoor | 1 ms | 5 s | 5 ms | 10 s |
| Forest | 5 ms | 10 s | 10 ms | 20 s |
| Urban | 10 ms | 20 s | 20 ms | 30 s |
| Inside building | Don't use GPS | N/A | Don't use GPS | N/A |
| London city centre | 20 ms | 20 s | Give up | N/A |
| Reigate Hill | 1 ms | 5 s | — | — |

The profile just contains an environmental tag which may be general or specific, and corresponding integration times and time limits after which the mode will change, for multiple modes. A profile may store more than this, and can store any information that could be conceivably useful when associated with an environment tag. For example a profile could be made more complex by the stipulation of different integration times for different satellites, e.g. perhaps based upon their elevations and post in the sky. Also some satellites at certain elevations are likely to have stronger signals than others. It is usually ones at higher elevations that offer stronger signals and require less integration time than those at lower elevations.

What is claimed is:

1. A method of operating a GPS receiver for the acquisition of GPS signals through the processing of the received signal over an integration time period, including the steps of switching the integration time period of the receiver between two discrete values, and switching between the said two discrete values in response to a signal, other than a GPS signal, indicative of the environmental factors within which the receiver is located, wherein the receiver employs (1) a predetermined operational profile and said at least two discrete integration time periods form part of the said profile or (2) a control signal for controlling said switching step is developed on the basis of an estimation of the local environment based on a time-indicating signal.

2. A method as claimed in claim 1, and employing a plurality of different profiles.

3. A method as claimed in claim 2, wherein each of the said plurality of profiles comprise respective different sets of integration time periods.

4. A method as claimed in claim 1, wherein a control signal for controlling the said switching step is delivered by means of a user interface so as to allow direct input by a user of the receiver.

5. A method as claimed in claim 1, wherein said control signal for controlling the said switching step is transmitted from a remote signal generation means.

6. A method as claimed in claim 5, wherein the said control signal is arranged to be received from a signal transmitter comprising an additional communications device, base station or Bluetooth beacon network.

7. A method as claimed in claim 1, and including the step of recording a successful acquisition strategy and correlating it to particular environmental conditions for future reference.

8. A method as claimed in claim 1, and including the step of determining a successful acquisition strategy so as to allow for the sharing of such strategies between a plurality of GPS receivers.

9. A method as claimed in claim 1, and including the step of delivering a signal-acquisition profile to the receiver from a remote device such as a base station, further device and/or Bluetooth beacon network.

10. A method as claimed in claim 1, and including the step of determining whether to use a hardware correlator or a software correlator for acquiring the required signal.

11. A GPS receiver arranged for the acquisition of GPS signals through the processing of the received signal over an integration time period, the receiver being arranged to operate with either of at least two discrete integration time periods and including control means for switching between the said integration time periods, wherein said control means is responsive to a signal, other than a GPS signal, indicative of the environmental factors within which the receiver is located;

and including a processor configured to switch the integration time period of the receiver between two discrete values, and switch between said two discrete values in response to a signal, other than a GPS signal, indicative of the environmental factors within which the receiver is located, wherein the receiver employs (1) a predetermined operational profile and said at least two discrete integration time periods form part of the said profile or (2) a control signal for controlling said switching step is developed on the basis of an estimation of the local environment based a time-indicating signal.

* * * * *